Nov. 20, 1934.  H. E. MUENCH  1,981,148
HEEL PLATE
Filed July 23, 1934

Inventor
Herbert E. Muench
by Rippey & Kingsland
His Attorneys.

Patented Nov. 20, 1934

1,981,148

UNITED STATES PATENT OFFICE 1,981,148

HEEL PLATE

Herbert E. Muench, University City, Mo.

Application July 23, 1934, Serial No. 736,579

5 Claims. (Cl. 74—564)

This invention relates to automobile heel plate adapted to be placed beneath an automobile foot pedal.

In many automobiles of present design the foot pedal for the throttle or accelerator is placed in such a position as to make it awkward and fatiguing except for a few individuals. This is particularly true with a woman whose foot is short. When the foot or ankle is placed in a strained position, intense and unnecessary fatigue is caused on long drives.

An object of this invention is to provide a heel plate which may be placed in an automobile beneath the foot pedal so arranged as to make it adapted for any size foot without cramping or placing the foot or ankle in a strained position. Furthermore, an easy position of the foot contributes to steadier operation and eliminates wear on the shoe.

Other and specific objects will be apparent from the following detail description taken in connection with the accompanying drawing, in which—

Figure 1:
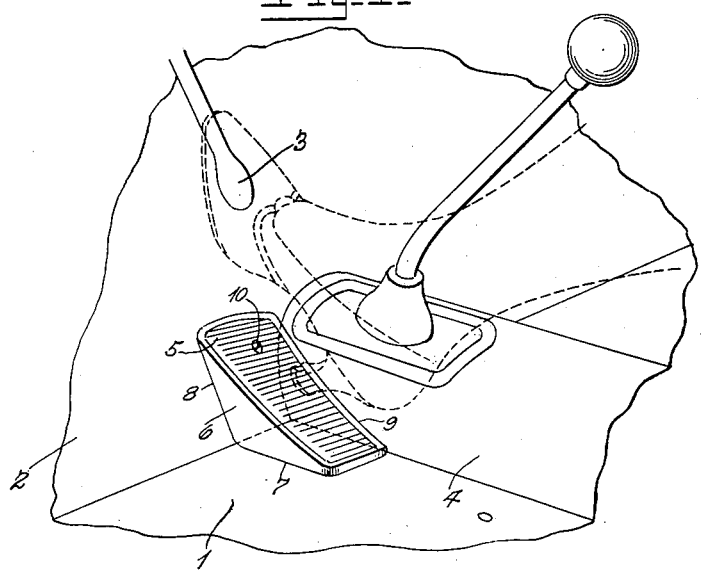
Fig. 1 is a perspective view of the device in association with the parts of an automobile with which it is intended to be used.
Figure 2:
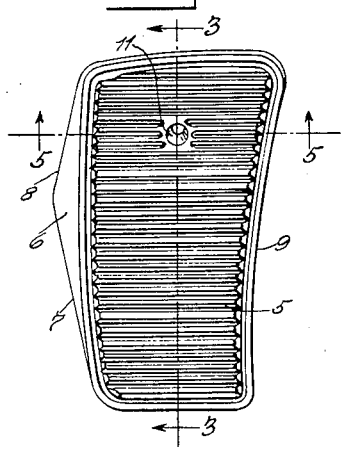
Fig. 2 is a plan view of the device.
Figure 3:
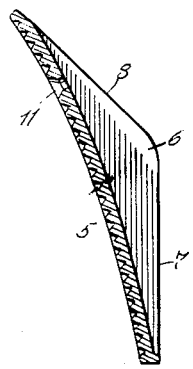
Fig. 3 is a vertical section on line 3—3, Fig. 2.
Figure 4:
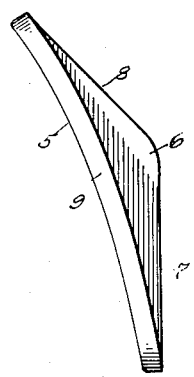
Fig. 4 is a side view of the device.
Figure 5:
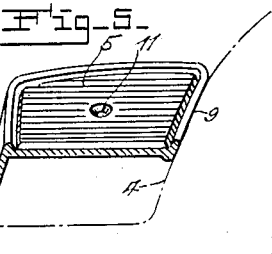
Fig. 5 is a section on line 5—5, Fig. 2, with the broken lines showing the environment in which the device is adapted to be used.

The essential parts of the invention are pointed out in the appended claims, and the accompanying drawing with the following description illustrate a preferred embodiment of the invention.

The specific device illustrated in the drawing is adapted to be used in an automobile having a floor 1, an apron 2, meeting the floor at an obtuse angle, and a foot pedal 3 adjacent the apron 2 and extending through or pivoted to the apron. The pedal 3 operates the throttle or accelerator of the automobile and as such requires the constant pressure of the foot while driving. In the automobile as shown and without the device of this invention the arrangement is comfortable for only a few people. For others the foot is placed in a strained position which causes intense fatigue on long drives.

In the typical example, the floor has an elevated portion 4, which is adapted to accommodate the transmission case of the automobile.

The device includes a corrugated heel engaging plate or surface 5, which is positioned below and adjacent to the pedal 3 by means of a downwardly extending angular flange 6 integral with the plate. The flange 6 has an edge 7 adapted to engage the floor 1 and an edge 8 adapted to engage the apron 2. The plate has an outer side edge 9 shaped to engage the edge of the raised portion 4.

The top surface of the plate 5 is arcuate in form on a low degree of curvature, for example, on a radius of 20 inches. The chord of the arc of the plate, in the specific example shown, meets the floor, or the edge 7, at an angle of approximately 23°. It is found that this angle should be between 18° and 35°. The edge 9 is curved as explained to fit the elevated portion 4 and no flange is placed along this edge permitting the portion 4 to extend somewhat below the plate 5. The surface of the plate 5 is corrugated in order that the heel may catch and hold in any corrugation to properly position the foot without causing a strain, and prevent the foot from slipping.

The device may be secured to the automobile by a screw 10 passing through an appropriate hole 11 in the plate 5 and engaging, as specifically shown in the drawing, the apron 2.

Thus, it will be seen that the invention accomplishes its objects. The angle, so far as the foot is concerned, between the floor and the apron is eliminated. There is substituted an elevated arcuate surface, graduated by corrugations, which makes for ease of operation and presents a safety factor by eliminating slipping of the foot, by reason both of the corrugations and the proper inclination of the surface.

It will be obvious that various changes may be made in the details of construction, within the scope of the appended claims, without departing from the spirit of this invention.

I claim:

1. In combination with a floor of an automobile, an apron meeting the floor at an obtuse angle, and a foot pedal adjacent the apron, the improvement comprising a plate having a corrugated surface constructed and arranged to provide a heel rest and extending substantially from the floor of the apron along an arc whose chord is at an angle to the floor of between 18° and 35°, an angular flange extending downwardly from the plate with an outer edge, one part of which is adapted to engage the floor and the other part adapted to engage the apron, and means for securing the plate in position.

2. In combination with a floor of an automobile with an elevation in the floor, an apron meeting the floor at an obtuse angle and a foot pedal adjacent the apron, the improvement comprising a heel plate having a corrugated surface constructed and arranged to provide a heel rest and extending substantially from the floor to the apron, one edge of which is adapted to fit and engage the elevation in the floor, an angular flange extending downwardly from the edge of the plate opposite the aforesaid edge, with one part of the flange adapted to fit the floor and the other part adapted to fit the apron, and means for securing the plate in position.

3. A plate having a corrugated surface constructed and arranged to provide a heel rest, an angular flange extending downwardly from one side of the plate, with one edge adapted to engage the floor of an automobile and another edge meeting the first edge at an obtuse angle and adapted to engage an apron of an automobile, the said surface of the plate lying along an arc whose chord is at an angle to the floor edge of the flange of between 18° and 35°, and means for securing the plate in position as aforesaid.

4. A plate having a corrugated surface adapted and arranged to provide a heel rest with one side curved and adapted to fit an elevation in the floor of an automobile, an angular flange extending downwardly from the other side of the plate with one edge adapted to fit the floor of the automobile and the other edge adapted to fit an apron of an automobile, the whole being constructed and arranged in such a manner that the surface of the plate is substantially on an angle to the floor, when the plate is in place, of between 18° and 35°, and means for securing the plate in position.

5. A plate of the character described having a corrugated surface constructed and arranged to provide a heel rest, an angular flange extending downwardly from the side of the plate, the opposite side of the plate being unflanged and adapted to extend above a plane upon which the plate is placed, and means for securing the plate in a position in which one edge of the angular flange engages the floor of an automobile and the other edge engages the apron of an automobile.

HERBERT E. MUENCH.